(No Model.)

J. WALTON.
VEHICLE SEAT.

No. 308,113. Patented Nov. 18, 1884.

WITNESSES:
Chas. Nida
D. A. Carpenter

INVENTOR
James Walton
BY
ATTORNEY

# UNITED STATES PATENT OFFICE.

JAMES WALTON, OF OLIVE, NEW YORK.

VEHICLE-SEAT.

SPECIFICATION forming part of Letters Patent No. 308,113, dated November 18, 1884.

Application filed August 14, 1884. (No model.)

*To all whom it may concern:*

Be it known that I, JAMES WALTON, of Olive, Ulster county, State of New York, have invented a new and useful Improvement in Lazy-Backs for Vehicles; and I declare the following to be a full, clear, and exact description of the same, reference being had to the accompanying sheet of drawings, forming part of this specification.

This invention is in the nature of an improvement in backs for vehicle-seats; and the invention consists in the devices hereinafter shown, described, and claimed, for securing the backs to vehicles.

Figure 1:
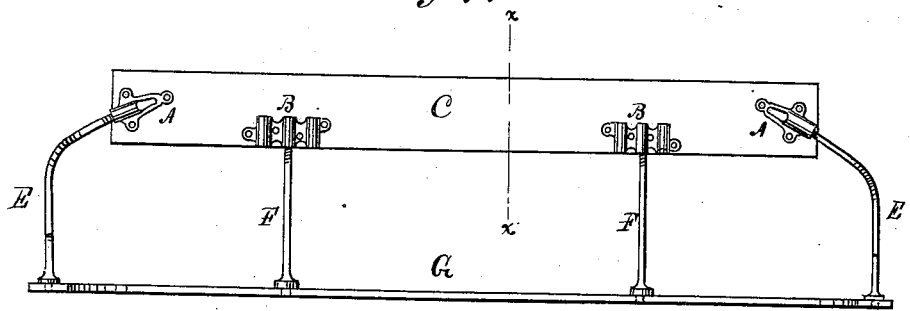
Figure 3:
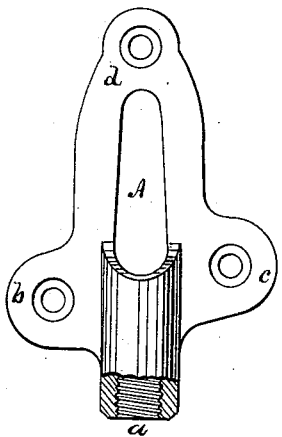
Figure 2:
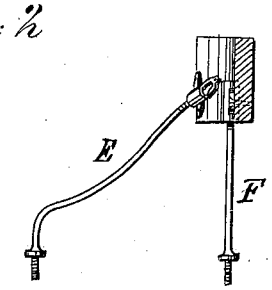
Figure 4:
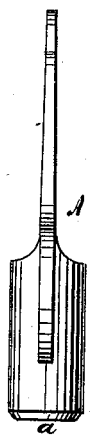
Figure 5:
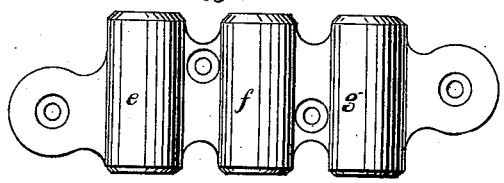
Figure 6:
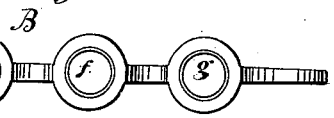

In the accompanying sheet of drawings, Figure 1 is a front view of my lazy-back in elevation; Fig. 2, a cross-sectional view in the line $x\ x$, Fig. 1; Fig. 3, a face view of brackets A; Fig. 4, an edge view of brackets A; Fig. 5, a front view of brackets B; Fig. 6, an edge view of brackets B.

Similar letters of reference indicate like parts in the several figures.

This invention relates to that class of backs for the seats of vehicles which are technically known to the trade as "lazy-backs," and these lazy-backs are simply a support of some kind fixed to the seat or seats of a vehicle, against which the occupant of the seat may rest his back. Heretofore, as a general thing, the wooden foundation for these backs has been fixed to the seat, or some part thereof, by simply flattening the ends of the side irons and standards, and through holes punched in these flattened ends screwing them to the back; but this way of fixing the back to the seat possesses the disadvantages hereinafter enumerated—that is, the diameter of the iron side arms and standards does not afford sufficient metal when the ends are flattened out, as before stated, to give a good bearing, or to admit of a sufficient number of screws to hold the irons fast to the back without weakening the flattened ends by the screw-holes. Besides, it is the custom to ship the seats and backs from the manufacturers to the dealers united and upholstered, which therefore make a bulky package when the seats and backs are secured by the old method, for, as is obvious, the ends of the side arms and of the standards must be screwed fast to the backs before the backs are upholstered, and after they are upholstered it is not possible to detach them. Now, to obviate these objections and some others which will be named, I cast or otherwise make a number of brackets, A, having screw-sockets $a$ and wings $b$ and $c$, and projection $d$. These wings $b$ and $c$ of the brackets are not opposite, but alternate. In addition to these brackets A, I also construct brackets B. In these last-named brackets are formed two, three, or more tubular sockets $e$, $f$, and $g$. The back C at the places where these brackets are to be fixed near the ends of the back, and midway between the ends and near the lower edge of the same, is cut out, so as to countersink the brackets A and B, and into these countersinks the brackets are placed and fixed in position by screws passing through the wings $b$ and $c$ and projection $d$. The upper ends of the side arms, E, have formed on them screw-threads corresponding to the screw-threads in the tubular sockets of the brackets A and B. Now, when these several brackets (two at the ends of the back C and two intermediate, as shown in Fig. 1) are secured in position and the back upholstered in the ordinary way, it is clear that the back can be secured to the seat without disturbing the upholstering, for it is simply necessary to screw the ends of the side arms, E, into the brackets A and the ends of the standards F into the brackets B, and with the usual nuts and screws unite the lower ends of these side arms and standards to the seat, or its iron frame G, when the seat and frame are at once properly and securely combined, and they are disconnected with the same facility. The seats and arms may therefore be shipped from the manufacturer separately or disunited, to be united by the dealer or user upon their receipt, so that the bulk of the shipment is greatly reduced and a saving of freight effected. Another advantage arising from my invention is that the irons may be painted, when disconnected, in the shop, and not be subjected, as now, to accidental injury during the process of upholstering or uniting the parts or shipping the seat. Another advantage is that by my invention a back may be furnished by the manufacturer to be applied to the seat of the vehicle of any other manufacturer—that is, it is customary for each manufacturer to perforate the iron strap G of the seat for the standards F by a gage or standard-strap, so that these perforations of the several makers vary, and it is to provide for these variations that the brackets B are made with a series of tubular sockets, so that the upper ends of the standards will be sure to find one of the sockets in proper position to receive it. Still another advantage arising from my invention is, the screws for fixing the brackets A and B to the back are not arranged in one and the same straight line, as in the old flattened irons; hence the tendency of the back to split because of the screw-holes therein is lessened.

Having now described my invention, what I claim as new, and desire to secure by Letters Patent, is—

1. In combination, the lazy-back of a vehicle-seat with tubular and threaded brackets A and B, side irons, E, and seat or strap G, and standards F, as and for the purpose described.

2. In combination, the lazy-back of a vehicle-seat with brackets B, constructed with a series of threaded tubular sockets, and standards F, and seat or strap G, as and for the purpose described.

3. In combination, the lazy-back of a vehicle with brackets A, constructed with alternate wings $b$ and $c$, as and for the purpose described.

JAMES WALTON.

In presence of—
J. S. EVERETT,
HUMPHREY EVERETT.